March 7, 1961 B. JULESZ 2,974,195

ECONOMY IN TELEVISION TRANSMISSION

Filed Oct. 30, 1958 2 Sheets-Sheet 1

INVENTOR
B. JULESZ
BY Harry C. Hart
ATTORNEY

March 7, 1961 B. JULESZ 2,974,195

ECONOMY IN TELEVISION TRANSMISSION

Filed Oct. 30, 1958 2 Sheets-Sheet 2

INVENTOR
B. JULESZ
BY Harry C. Hart
ATTORNEY

United States Patent Office 2,974,195

Patented Mar. 7, 1961

2,974,195

ECONOMY IN TELEVISION TRANSMISSION

Bela Julesz, Madison, N.J., assignor to Bell Telephone Laboratories, Incorporated, New York, N.Y., a corporation of New York Filed Oct. 30, 1958, Ser. No. 770,858

16 Claims. (Cl. 178—43.5)

This invention deals with transmission of television waves by irregular sampling techniques. Its general object is to reduce the number of wave samples that must be derived and transmitted in order that data shall be available at a receiver station in sufficient numbers to serve as a basis for the reconstruction of the original wave and therefore of a satisfactory image of the scene from which it was derived.

In contrast to conventional systems in which a television signal is transmitted without further processing, or after sampling its amplitudes at the Nyquist rate and transmitting these samples in coded form, systems have been proposed which undertake to turn the statistics of the television wave to account by deriving samples or other indicia of its momentary character from the wave only at instants at which the wave changes in some significant fashion and transmitting these samples instead of regular Nyquist rate samples. Because of the high degree of temporal irregularity which characterizes the fluctuations of a television wave the sample sequence thus derived is similarly irregular; that is to say the samples recur sometimes at the Nyquist rate and sometimes with much lower frequency. Advantage may be taken of this irregularity of sample recurrence by transmitting the samples on a distorted time scale and at a regular average rate that is substantially less than the Nyquist rate. At the receiver station the real time scale and the irregular sampling instants are restored, the samples are reproduced on the true time scale and the vision signal is reconstructed from the sequence of reproduced samples.

In order that full advantage may be taken of the possibilities of economy offered by systems of this character it is essential that the significant and meaningful features of the wave under consideration be thoroughly understood and carefully recognized and that the sampling instants be selected in accordance with some rule designed to derive, from the wave, the highest possible amount of meaningful information as to these significant features, while suppressing information which is not significant to the same degree. In general, systems of the kind under consideration have suffered from the failure to take into full account the geometrical, psychophysical and psychological considerations which distinguish those features of a television wave which are highly significant to an observer from those whose significance is of much lower order.

The present invention stems from the recognition that the objects in the world external to an observer have, for the most part, sharp outlines, and that he distinguishes among them principally by observation of such outlines; that any gradation of brightness between such outlines serves, for the most part, to qualify the impression formed by the observer of an individual object seen, rather than to distinquish between such objects; and that nature has developed the eye and the associated nervous mechanism in such a fashion as to furnish the observer with precise information as to the location of outlines, and information of a much coarser nature as to brightness gradations between such outlines. Hence, for optimal quality of an image reproduced from a sequence of samples of a television wave transmitted at a given sample transmission rate, the samples should define the outlines of the objects of the scene with high precision and a very approximate representation of the brightness and gradations of brigthness between such outlines suffices for most purposes.

Accordingly, the invention provides a rule, and instrumentation for carrying it out, under which samples are taken of the amplitude of a television wave at and only at those points at which its rate of change (or, to employ the graphical counterpart of this term for ease of description, its "slope") changes sign, becomes zero or departs from zero. In the case of a wave having negligible portions of zero slope, this rule reduces to picking each upward-going peak and each downward-going peak. When, as occurs in most television scenes, the wave undergoes a sudden change in character and contains extended portions of zero slope, this rule reduces to picking the start point and the finish point of each such flat portion.

The highly irregular sequence of samples thus taken is now transmitted to a receiver station at a uniform average rate, much less than the rate of taking samples when their density is high. Substantial transmission economy is thus secured. Distortion of the time scale before transmission and restoration afterward may advantageously be carried out with the aid of time scale buffers.

The foregoing rule excludes the sampling of the wave at points where its slope, already positive (or negative) becomes still more, or still less positive (or negative); that is to say at points at which the slope changes in magnitude but not in sign. This exclusion is secured by quantization of the wave slope to three levels which may be designated 1 (rising), $-1$ (falling) or 0 (flat), accordingly as the wave slope exceeds a preassigned threshhold $\epsilon$, lies below a preassigned threshold $-\epsilon$ or fails between the two thresholds.

A very fine threshold $\epsilon$ has advantages for some portions of the wave while a coarser threshold $\epsilon$ has advantages for other portions. In accordance with a further feature of the invention, therefore, the sampling rule is carried out twice and simultaneously, once with a fine threshold and again with a coarse one, and a wave sample is taken when either of the two threshold devices indicates that it should be taken. For the most part, the indications of the two devices are identical. When they differ, the advantage in reproduced image quality more than offsets the corresponding slight increase in apparatus complexity and average sampling rate.

In one embodiment, the invention provides instrumentation for the carrying out of the foregoing rules by way of sampling control apparatus of which the principal components are a first differential circuit for the television wave itself, a three-level quantizer which quantizes the differential as having the magnitude $-1$, $+1$ or 0 accordingly as the wave slope lies below a lower threshold, above an upper threshold, or between the two, a second differential circuit for the quantizer output, a rectifier and a limiter, connected together in a control path and in tandem in the order named. Advantageously, another control path is provided, differing from the first only in the proportions of the three-level quantizer so that its thresholds shall differ in magnitude from those of the first control path. The outputs of the two paths are combined and, as combined, constitute an irregular train of intermediate control signal pulses.

The time interval elapsing between each intermediate control signal pulse and the next one is measured by a timer, which may advantageously comprise a self-resetting binary counter, for example a four-stage counter capable of measuring intervals of any length up to 16 Nyquist intervals, sufficient in most cases, whereupon it resets itself. In accordance with a further feature of the invention, and to avoid the necessity of providing a counter of extreme storage capacity, for the most part unused, the counter reset signal, whether it be the intermediate control signal itself or the self-resetting signal derived from the counter, operates as a sampler-actuating signal, and controls the operation of sampling the amplitude of the vision signal. Thus, when a portion of the signal wave occurs which remains at constant slope for a period in excess of the timer capacity, a wave amplitude sample is taken without regard to the momentary characteristics of the television wave. Such samples, if they are taken at all, are taken at a regular rate which is well below the average sample transmission rate on the transmission medium. Hence, taking of such samples places no additional demands on the capacity of the medium while it avoids degradation of the received image which might result from an incorrect time interval measurement and, at the same time, avoids the need for preventing this eventuality by the provision of excessive storage capacity.

The invention will be fully apprehended from the following detailed description of an illustrative embodiment thereof, taken in connection with the appended drawings in which.

Figures 1, 2, 3:
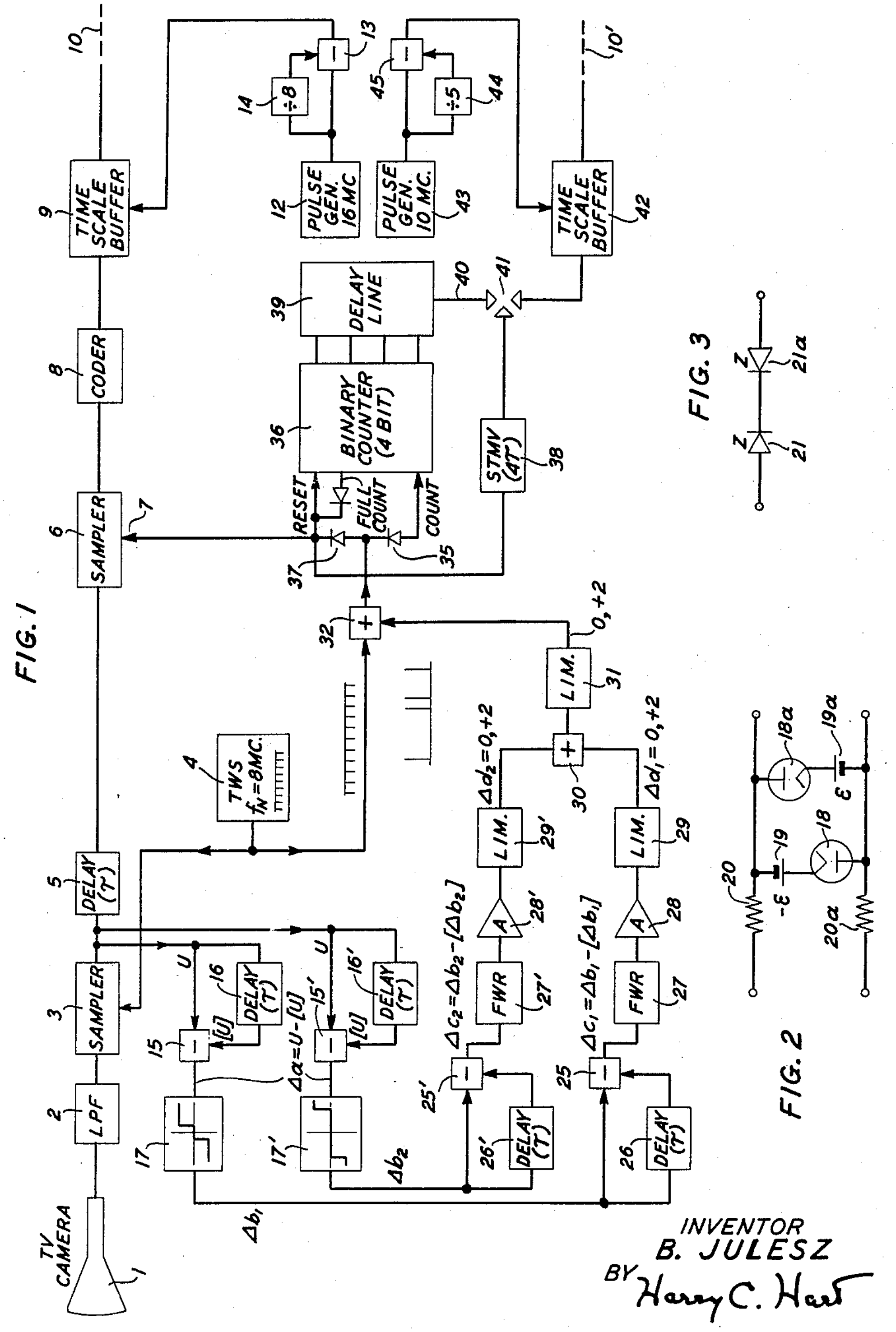
Fig. 1 is a block schematic diagram showing apparatus for processing a television wave for transmission in accordance with the invention.
Figs. 2 and 3 are schematic circuit diagrams showing wave-clipping and wave-slicing components of the apparatus of Fig. 1.

In the interests of simplicity, the circuit diagrams to be discussed are presented, for the most part, in block schematic form, with single-line paths which direct the flow of energy and information and apparatus components which process it. This rule is departed from in a few individual instances where the inclusion of electrical input terminals and output terminals appears to add to the clarity of the exposition. It is to be understood that, in practice, each single-line energy path will normally be actualized with two electric conductors, one of which may in many cases be connected to ground.

Referring now to the drawings, a television wave originating in a camera tube 1 is first passed through a low-pass filter 2 whose upper cutoff frequency is located on the frequency scale at the Nyquist frequency which, in the case of present day television standards is about 8 megacycles per second; that is to say it passes all frequencies in the range $$0-\frac{1}{2\tau}$$

where $\tau$ is the Nyquist interval. This filter ensures the removal of wave components with which the remainder of the apparatus cannot cope. The signal thus filtered is applied to the input terminal of a sampler 3 that is actuated by the pulse output of a timing wave source 4 proportioned to deliver pulses at the Nyquist rate. For reasons that will appear below the output pulses of the timing wave source 4 are preferably negative-going pulses, and the sampler 3 is constructed to accept them.

The Nyquist rate samples of the wave thus derived are delayed by a single Nyquist interval $\tau$ by a delay device 5 of any desired sort, for example a wave propagation line terminated for no reflection. The regular train of samples thus derived is now applied to the input terminal of a second sampler 6 which delivers on its output terminal a brief sample of the amplitude of the incoming television wave, each time its control terminal 7 is energized. Each of the resulting wave samples is applied, in turn, as it occurs, to a coder 8 which encodes it according to a pre-assigned code, for example the seven-digit binary permutation code. The sampler 6 and the coder 8 may be of any desired construction, e.g., those described by L. A. Meacham and E. Peterson in the Bell System Technical Journal for January 1948, vol. 27, page 1.

The description of the actuation of the second sampler will be postponed, for the present, with the remark that the actuating pulses derived as described below occur irregularly on the time scale.

Because the enabling pulses are applied to the control terminal 7 of the sampler 6 irregularly, the code pulse groups appear at the output terminal of the coder 8 irregularly. To obtain the full benefits of the invention, it is advantageous to convert the irregular sequence of code pulse groups to a regular one prior to transmission. To this end a time scale buffer 9 is included in tandem between the coder 8 and the transmission channel 10. Apparatus components of this kind are well known and are described, for example, by A. L. Leiner in "Buffering Between Input-Output and the Computer," published in March 1953 by the American Institute of Electrical Engineers at page 22 of a report of a joint AIEE-IRE-ACM Computer Conference, with the title "Review of Input and Output Equipment Used in Computing Systems." Apparatus having the same performance and utilizing an electrostatic beam storage tube as its central component is described by A. J. Lephakis in "An Electrostatic Tube Storage System," published in the Proceedings of the Institute of Radio Engineers for 1951, vol. 39, page 1413.

The buffer 9 is preferably actuated to deliver outgoing code pulse groups to the transmission channel 10 in regular succession and at the average rate at which transitions follow one another in a television wave, for example, at about 3,000,000 groups per second. The normal buffer requires a control pulse individual to each output pulse of each group. Hence a train of seven control pulses is required for each output code pulse group. In order that the individual groups may be readily distinguished from each other a guard space of duration equal to a single pulse interval may be provided between successive groups.

Groups of pulses to control the time scale buffer 9 may readily be generated in various ways. A simple and convenient arrangement comprises a pulse generator 12 proportioned to deliver a regular unbroken train of pulses at a repetition rate of about 16 megacycles per second. Its output terminal is connected to one input terminal of a subtractor 13. The pulse generator output is also applied to a divider 14, e.g., a single trip multivibrator, proportioned to divide the pulse rate by eight. The output of this divider is connected to the second input point of the subtractor 13. With this arrangement, the pulses of the generator 12 pass through the subtractor 13 to the control terminal of the buffer 9 until seven such pulses have passed through, but the eighth is blocked by cancellation in the subtractor 13 because, at and only at the eighth pulse interval are pulses applied to both input terminals of the subtractor 13.

Returning now to the process and apparatus by which the wave samples to be transmitted are derived, the output of the first sampler 3 consists of a regular sequence of amplitude samples recurring at the Nyquist rate. They are thus quantized on the time scale but not in amplitude. The train of such samples is applied to one input point of a subtractor 15 and, through a delay device 16 proportioned to introduce a delay of a single Nyquist interval, to the other input point of the subtractor 15. Denoting any particular sample of the train by the symbol "$u$" and the prior sample by the symbol "$[u]$," the output of the subtractor 15 is a differential signal, namely, $$\Delta_a = u - [u]$$

This differential is next applied to a three-level quantizer 17 whose operation is to deliver an output of magnitude +1 when $\Delta_a$ exceeds a preassigned threshold $\epsilon_1$, an output of magnitude −1 when $\Delta_a$ lies below a preassigned threshold $-\epsilon_1$ and an output of zero $\Delta_a$ lies within the range $-\epsilon_1$ to $+\epsilon_1$. This output may be termed $\Delta_{b1}$. In the drawing, the characteristic shown in the box 17 reaches from $-\epsilon_1$ to $\epsilon_1$ on the horizontal zero axis, falls to −1 below $-\epsilon_1$ and rises to 1 above $\epsilon_1$. It is therefore representative of the required operation.

The thre-level slicer 17 may have any desired construction. In one form it comprises a clipper and a slicer connected together in tandem in the order named. One of many suitable clippers, shown in double-line schematic fashion in Fig. 2, comprises two rectifiers 18, 18*a*, oppositely poled and oppositely biased as by batteries 19, 19*a* each of voltage $\epsilon$, connected in parallel between two output conductors, and a resistor 20 connected in series with each input conductor. As is well known, this combination passes a voltage signal applied to it without change provided its magnitude is between the two clipping levels determined by the bias batteries 19 while, for amplitudes above the upper clipping level $\epsilon$ or below the lower clipping level $-\epsilon$, the amplitude of the output signal is constant at a magnitude determined by one or other of the bias batteries 19.

The slicer performs an operation inverse to that of the clipper: it passes wave amplitudes supplied to it above its upper slicing level or below its lower one without change while blocking signals lying between the upper slicing level and the lower one. One of the simplest of many alternative such slicers is shown in Fig. 3. It is constituted of a pair of controlled breakdown rectifiers of Zener diodes 21, 21*a* connected back to back as shown.

The use of controlled breakdown rectifiers or so-called Zener diodes in this fashion is disclosed in W. Shockley Patent 2,714,702, granted August 2, 1955. Suitable devices of this sort and their characteristics are discussed in an article by G. L. Pearson and B. Sawyer published in the Proceedings of the Institute of Radio Engineers for November 1952, vol. 40, page 1348. The composite characteristic of the oppositely poled pair is shown in Fig. 6.

The tandem combination of the clipper and the slicer serves to deliver a positive output of an amplitude which may be denoted as 1 for all inputs above the upper clipping threshold $\epsilon$, a negative output of −1 for all inputs below the lower clipping threshold $-\epsilon$, and an output of zero for all inputs lying between the upper threshold and the lower one, as indicated by the diagram on the box 17.

To improve the certainty of operation of the combination an amplifier may be connected between the clipper and the slicer.

The quantized differential $\Delta_{b1}$ is now applied to a second differentiator which, like the first, may comprise a subtractor 25 having two input points to one of which the quantity itself is applied while the same quantity, delayed as before by a single Nyquist interval by a device 26 is applied to its second input point. The output of this second subtractor 25, which may be designated $\Delta_{c1}$ is, following the notation employed above, given by:

$$\Delta_{c1} = \Delta_{b1} - [\Delta_{b1}]$$

The subtraction operation of the second differentiator, in combination with the three-valued character of the quantity $\Delta_{b1}$, determined by the three-level slicer 17, results in the fact that $\Delta_{c1}$ may have any of five values, namely −2, −1, 0, 1, 2. This quantity is next applied to a full wave rectifier 27 which inverts each negative value to deliver, at its output point, a signal which may have any of the three values 0, 1 or 2. This signal is passed through an amplifier 28 and thus increased in magnitude by a factor of at least 2 and preferably, for safety, by a greater factor to give a signal which may have any of the three magnitudes 0, 2 (or more), 4 (or more). The signal thus amplified is next passed through a limiter 29 which reduces all magnitudes of 2 or more to the magnitude 2, leaving as its possible outputs the magnitudes 0, 2. This signal, designated $\Delta_{d1}$, is applied to one terminal of an adder 30.

The other terminal of the adder 30 is supplied with a signal of the same character, designated $\Delta_{d2}$, which may be derived by apparatus that is similar in all respects except that the thresholds $\epsilon_2$ and $-\epsilon_2$ of the second three-level slicer 17′ differ substantially from those of the first one, 17. It has been determined that an advantageous magnitude for the threshold $\epsilon_1$ of the first three-level slicer 17 is four percent of the full amplitude range of the television wave, while an advantageous value for the threshold $\epsilon_2$ of the second three-level slicer 17′ is ten percent of the full amplitude range of the wave.

The output of the adder 30 is passed through a limiter 31 which restricts it to magnitude 0 or 2, thus preventing the occurrence of a magnitude 4 in the event that a signal $\Delta_{d2}$ should reach the adder 30 from the second limiter 29′ at the same instant as the signal $\Delta_{d1}$ reaches it from the first limiter 29.

The control signal thus derived, and consisting of positive pulses of magnitude 2 recurring irregularly in time, is now applied to the first input point of a second adder 32 while the train of negative, unit-magnitude pulses from the timing wave source 4, recurring regularly at Nyquist intervals, is applied to the second input point of the adder 32. The signal appearing on the output terminal of the adder 32 thus comprises a bipolar train of pulses, of which the positve pulses are irregular while the negative ones are regular. The negative members of this bipolar pulse train are applied through a rectifier 35 to the input point of a binary counter 36 which may be proportioned to count them as they occur up to a preassigned number such as 16; i.e., it may be a "four-bit" counter. The positive members of the bipolar pulse train are applied through another rectifier 37 to the reset terminal of the counter 36 and also to the input point of a single trip multivibrator 38 proportioned to return to its rest or Off condition after the lapse of four Nyquist intervals following the application to it of a positive tripping pulse which drives it into its On condition. The four conventional output points of the counter 36 are connected to four equally spaced taps of a conventional delay line 39 terminated for no reflection. This delay line operates to convert the parallel output code of the counter 36 into a serially arranged code pulse group at the output point 40 of the delay line 39, one such group for each count. Only those groups that represent the count at the time the counter 36 is reset are to be utilized, the others being discarded. This is readily accomplished by connecting the output point 40 of the delay line to one conduction terminal of a switch 41 that is actuated throughout the propagation time of the delay line 39 by the output of the single trip multivibrator 38 each time a reset pulse occurs. Thus, only the desired pulse groups pass through the switch 41.

In accordance with the invention each reset pulse, whose separation on the time scale from its predecessor has thus been counted, is also utilized as a marking signal to control the sampling of the incoming vision wave. To this end it is applied to the control terminal of the second sampler 6. This sampler 6 is porportioned to respond only to positive pulses. It is thus insensitive to the Nyquist rate pulses of the timing wave source 4, which are negative.

Because of the irregular character of the sampling operation, the successive code pulse groups appearing at the output conduction terminal of the switch 41 and representing the intervals between each reset pulse, and therefore each sample, and the next are arranged with a high degree of irregularity on the time scale. For transmission economy they are preferably transmitted in regular fashion. They may be regularized on the time scale by a buffer 42 which may be identical with the time scale buffer 9 described above for the amplitude sample channel. Because the intervals have been coded in four-digit code pulse groups the buffer 42 may be controlled in a fashion similar to that described above except that the pulse generator 43 is proportioned to deliver pulses at a repetition rate of about 10 megacycles per second and the divider 44 and the subtractor 45 are arranged and proportioned to eliminate each fifth pulse, thus to leave groups of four pulses each, separated by guard spaces of a single pulse interval in length.

The coded amplitude samples and the coded intersample intervals may now be transmitted by any desired techniques to a receiver station. Inasmuch as the code pulse groups occur in pairs, one member representing a sample amplitude and the other an interpulse interval, it is convenient to employ two-channel time division techniques; in particular, to generate a supergroup of eleven pulses of which the first seven define the magnitude of the amplitude sample while the last four define the interpulse interval. This permits simplification of the buffer read-out mechanism in that, with this arrangement a single read-out pulse generator delivering eleven pulses for each supergroup may replace the two generators 12—14 and 43—45 which deliver eight pulses and five pulses, respectively. Pulse group delay devices of a type well known may be employed to insert each group of four interval-defining pulses in the gap between two adjacent amplitude defining pulses.

After transmission of the pulse groups of both types to a receiver station they may be separated into their respective amplitude and interval channels by apparatus of well-known character whereupon the incoming information is to be processed in a fashion to eventuate in the final reproduction of a television image.

Figure 4:
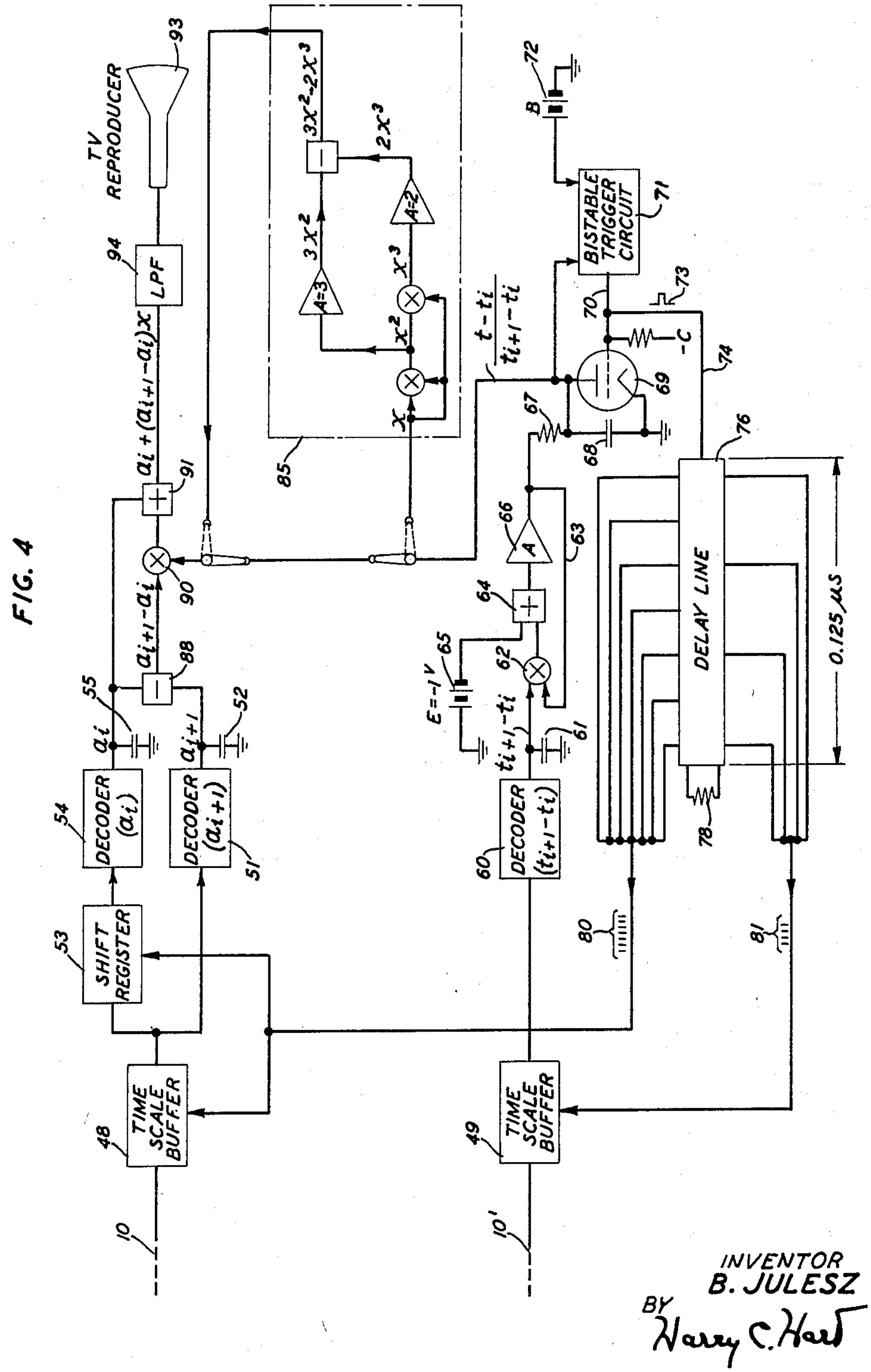
Fig. 4 is a schematic circuit diagram showing receiver apparatus adapted to reconstitute a television image from signals delivered by the apparatus of Fig. 1.

Fig. 4 shows apparatus of suitable character. The incoming amplitude code pulse groups, arriving by way of the transmission medium 10, 10', are first applied to an amplitude time scale buffer 48 and the incoming interval code pulse groups are similarly applied to a second time scale buffer 49. These time scale buffers may be identical in construction with the buffers 9, 42 described above in connection with Fig. 1. Their operations, however, are inverse to the operations of the former time scale buffers, in that they receive information-carrying pulse groups in regular sequence and deliver them irregularly, thus restoring, at the output terminals of the buffers, the original time scale which obtained at the input terminals of the first pair of buffers. This result is achieved by the application to the control terminals of the receiver buffers 48, 49 of enabling pulses at all proper instants, generated in the fashion to be described below.

Assuming, for the present, that such control apparatus operates as required, the output of the amplitude channel time scale buffer 48 thus consists of a sequence of code pulse groups, irregularly spaced in time, each of which represents the amplitude of a single wave sample. These code pulse groups are applied, as they appear, to a decoder 51 which restores the information contained in each such group from its digital form to its original analog form; i.e., it converts the code pulse group into an amplitude sample. This decoder may be of any desired type, e.g., that described by L. A. Meacham and E. Peterson in the Bell System Technical Journal for January 1948, vol. 27, page 1. Each output pulse of the decoder 51 is preferably stretched in time until the occurrence of the next output pulse, as by a conventional amplitude-holding circuit, here shown illustratively as a condenser 52 of which one terminal is connected to the decoder output terminal and the other is connected to ground. The same code pulse groups appearing at the output terminal of the time scale buffer 48 are also applied to a shift register 53 which may be of conventional construction as described, for example, in "Pulse and Digital Circuits" by J. Millman and H. Taub (McGraw-Hill, 1956). This shift register 53 is under control of the same actuating pulses as is the time scale buffer 48. Hence each time a code pulse group is delivered by the time scale buffer 48 to the input terminal of the shift register 53 the preceding code pulse group is retrieved at the output terminal of the shift register 53. The code pulse groups of this irregular series thus retrieved from the shift register 53 are applied to a second decoder 54 which may be identical with the former decoder and which, like the former one, converts each pulse group applied to its input point to an amplitude sample. These amplitude samples are stretched, like those of the former decoder 51, by a holding circuit 55.

Thus, because of the delay of one intersample interval introduced by the shift register 53, the outputs of the two decoders 51, 54, at instant $t_1$, represent the amplitudes of two successive samples, the output of the upper decoder 54 representing the most recent sample and the output of the lower one representing the next sample to come. This time relation is indicated in conventional terminology by the legend $a_1$ to designate the output of the upper decoder 54, the most recent sample, and the legend $a_{1+1}$ to designate the output of the lower decoder 51, the sample to follow next.

The output of the lower time scale buffer 49 consists of an irregular series of code pulse groups each of which represents the interval between each sample and the next one. These pulse groups are applied in succession to a decoder 60 which converts them to analog form; that is to say, each output pulse of the decoder 60 has a magnitude proportional to the interval in question; i.e., to the interval $t_{1+1}-t_1$. Each of these output pulses is preferably stretched in time, as by a holding circuit 61.

The quantity $$\frac{1}{t_{1+1}-t_1}$$

needed in the generation of the interpolation function, is next generated by a reciprocating circuit. While the latter may be of any desired construction a convenient one follows the principle that by the inclusion in a feedback loop of an apparatus component which by itself carries out a specified operation, the loop as a whole carries out the inverse operation. Thus the output of the decoder 60 is fed to one input point of a multiplier 62 to whose other input point a feedback conductor 63 is connected. The multiplier output point is connected to one input point of an adder 64 to whose other input point a potential source 65 of −1 volt is connected. The output of the adder 64 is applied to an amplifier 66 of gain factor A, preferably large. The output terminal of the amplifier 66 is connected by way of the feedback path 63 to the second input terminal of the multiplier 62.

That this circuit carries out the reciprocating operation may readily be seen from the following elementary analysis, following a treatment which is now conventional for feedback circuits generally.

If E be the voltage at the output terminal of the amplifier 66, A be its gain factor and *e* be the quantity applied from the decoder 60 to the first input terminal of the multiplier 62 then the output of the multiplier 62 is the product of its two inputs, namely E and *e*. To this is added the quantity −1 from the source 65 by the adder 64 and the sum is applied as the input to the amplifier 66. The amplifier in effect multiplies this sum by the gain factor A and produces, as the product, the output voltage E.

These operations may be concisely expressed by the equation $$E=A(Ee-1) \quad (1)$$

of which the solution is $$E=\frac{1}{e-\frac{1}{A}} \qquad (2)$$

With a large magnitude for the gain factor A, the second term of the denominator may be disregarded so that Equation 2 reduces approximately to $$E=\frac{1}{e} \qquad (3)$$

As stated above, the signal $e$ applied to the first input point of the multiplier 62 is the same as the output signal of the decoder 60, as stretched by the holding circuit 61. That is to say, $$e=k(t_{i+1}-t_i) \qquad (4)$$

where $k$ is a constant of proportionality. Hence combining (4) with (3), $$E=\frac{1}{k(t_{i+1}-t_i)} \qquad (5)$$

Or, the output E of the amplifier 66 is proportional, during each intersample interval, to the reciprocal of the length of that intersample interval.

The reciprocal of the intersample interval thus derived is next utilized to develop a normalized time variable for use in the generation of the required interpolation wave. This is simply accomplished in the following way. The output E of the amplifier 66 is applied to a series combination of a resistor 67 and a condenser 68 in such a fashion that the condenser 68 is charged by the voltage E through the resistor 67 and at a rate dependent on the magnitude of E and on the product of the resistance by the capacitance. In order that the charging rate shall be sensibly constant over the periods of interest the capacitance of the condenser 68 should be appropriately large. If desired, a supplementary compensating network of the type known as a "boot strap" circuit may be employed still further to linearize the charging rate.

The conduction path of a voltage-controlled switch of any variety, here shown for illustration as a triode 69, is connected directly across the terminals of the condenser 68. The grid of this triode, normally biased to cutoff, is connected to the output terminal 70 of a trigger circuit 71 which may, for example, be of the type described by A. B. Schmidt in the Journal of Scientific Instruments for 1938, vol. 15, page 24. This trigger circuit 71 is provided with two input points one of which is connected to one terminal of the condenser 68 while the other is connected to a bias battery 72 of voltage B. The behavior of the trigger circuit 71 is that, as the charging of the condenser 68 proceeds, the trigger circuit remains quiescent until the condenser voltage, of which the momentary magnitude is V, has reached the magnitude of B volts whereupon, the voltage V being applied to the first input point of the trigger circuit being in excess of the voltage B applied to its second input point, the trigger circuit 71 switches abruptly from one state to the other state and applies a positive voltage to its output terminal 70 and hence to grid of the triode 69. The triode 69 then short-circuits the condenser 68, bringing its voltage abruptly to zero and thus returning the trigger circuit 71 to its first conduction state. As a result, a brief pulse 73 is delivered by way of a conductor 74 each time the condenser 68 is discharged, and this event marks the conclusion of the charging interval.

It is the consequence of this sequence of events that, during each charging interval the voltage across the condenser 68 increases linearly with time as measured from the most recent instant of discharge $t_i$, from its initial zero value to its final value B, and at the rate $$\frac{dV}{dt}=\frac{1}{kRC(t_{i+1}-t_i)} \qquad (6)$$

Integration of (6) from the most recent discharge instant $t_i$ to the present time gives $$V(t)=\frac{t-t_i}{kRC(t_{i+1}-t_i)} \qquad (7)$$

At the conclusion of the charging interval, when $t$ has reached the value $t_{i+1}$, this voltage reaches the preassigned magnitude $V_1=B$. Hence, at this concluding instant, $$V_1=B=\frac{t_{i+1}-t_i}{kRC(t_{i+1}-t_i)} \qquad (8)$$

From (8), $$BkRC=1 \qquad (9)$$

Substituting (9) in (7) and dividing both sides by B, we have $$\frac{V}{B}=\frac{t-t_i}{t_{i+1}-t_i} \qquad (10)$$

It is evidently a simple matter to proportion the constants $k$, R, C, B in such a way as to satisfy Equation 9. The constant B, the only one which appears explicitly in Equation 10, serves there merely as a scale factor. To avoid unnecessary complication of the following development, it will be assumed equal to unity, in which case, also, $$kRC=1 \qquad (9a)$$

and $$V=\frac{t-t_i}{t_{i+1}-t_i} \qquad (10a)$$

If a threshold voltage other than unity be for any reason desired, the corresponding changes of the development to follow, and of the circuit to be described, will be apparent to the reader.

It will be recalled that the trigger circuit 71 trips, the condenser 68 is discharged, and an output pulse 73 is delivered when the condenser voltage V reaches the tripping voltage B, i.e., when the ratio $V/B$ reaches the magnitude 1 volt. Equation 10 shows that this condition is reached when the charging time has attained equality with the latest completed intersample interval. Hence the output pulse occurs at the instant $t_{i+1}$ to mark the end-point of the current interval and the starting point of the next one. It may therefore be utilized to control the actuation of the time scale buffers 48, 49, and of the shift register 53, thus to read out of the buffers the data which define the next sample, namely the amplitude $a_{i+2}$ and the time interval $t_{i+2}-t_{i+1}$, and to read each code pulse group out of the shift register at the moment the next one is written into it. For the buffer 48 and the shift register 53 a group of seven pulses is to be read out of the apparatus, so that the control pulses are to be delivered in groups of seven. To convert the output pulse of the trigger circuit 71 into a seven-pulse train, each output pulse 73 may be applied over the conductor 74 to the input terminal of a delay line 76 having an appropriate number of equally spaced lateral output taps, in this case seven, all connected together, and terminated as by a resistive load 78 for no reflection. This combination converts each input pulse into a sequence of seven output pulses 80 in well-known fashion. If no overall delay is required in addition to the conversion, and such is usually the case, the first output point of the delay line 76, shown for illustrative purposes as a lateral tap, may in fact be connected directly to the input point of the delay line. Similarly, the delay line 76 is provided with a second group of lateral taps, four in number, and uniformly spaced along the length of the line. The outputs of these taps, connected together, constitute a four-digit pulse code group 81, of the type required to control the read-out operation from the time scale buffer 49.

Inasmuch as the function of the two time scale buffers 48, 49 is to restore the original speech sample time scale, the pulses of the code groups which constitute the outputs of these buffers are preferably substantially compressed on the time scale, thus to allow for a temporary rapid succession of coded wave samples without overlapping or interference between them. This compression is readily secured simply by the proportionment of the delay line 76 to give a desired total retardation. A delay of about 0.0178 microsecond between successive taps of the group of seven, and of 0.0312 microsecond between those of the group of four, and hence an over-all delay for all seven taps of about 0.125 microsecond is recommended.

The voltage V of Equation 10*a* may now be applied to an interpolation wave generator whose function it is to generate a wave segment which, continuously throughout the intersample interval represents, exactly or approximately, that portion of the original television wave which interconnects two successive amplitude samples. Any such wave portion may be represented generally as $$W=S\left[\frac{t-t_i}{t_{i+1}-t_i}\right] \qquad (11)$$

or, substituting the variable $x$ as an abbreviation for the argument; that is, putting $$x=\frac{t-t_i}{t_{i+1}-t_i} \qquad (12)$$

there results $$W=S(x) \qquad (13)$$

Waves following various mathematical forms can be constructed to satisfy the requirement that they shall coincide with the two samples which bound each interval, have zero derivatives at each end, and be continuous between. One such mathematical form, which closely approximates a half cosine wave, is $$F=a_i+(a_{i+1}-a_i)(3x^2-2x^3) \qquad (14)$$

Apparatus for generating the wave defined by the factor in the second parentheses of Equation 14, shown in the box 85, is fully described in an application of M. V. Mathews, Serial No. 684,993, filed September 19, 1957. That application deals with the reconstruction of a voice wave from transmitted information as to the amplitudes of its peaks and their instants of occurrence. In the reproduction of voice waves all discontinuities, not only of the wave itself but of its derivative, are to be avoided. Hence for the system of that application an interpolation wave generator of some complexity, such as that shown in the box 85 is advantageous.

In the case of a vision signal, however, it is important to reproduce, as closely as possible, the sharp discontinuities which normally characterize a scene from which the signal was derived, and of much less importance to reproduce variations and gradations of brightness between them. This can conveniently be accomplished by employing straight line interpolation between each sample and the next one; that is to say by employing the simplest possible form of interpolation wave generator which delivers an interpolation wave that is itself a linear function of time over each intersample interval. The operation of such a linear interpolation wave generator may be expressed as $$W=x \qquad (13a)$$

The voltage developed at the anode of the tube 69 and given by Equation 10*a* is just such a linear interpolation wave.

The wave segment given by Equation 10*a* is now interpolated between the adjacent samples, where it belongs, in the following fashion. The output of the upper amplitude decoder 54 is subtracted from that of the lower decoder 51 by a conventional subtractor 88 to give the quantity $$a_{i+1}-a_i$$

This is applied to one input point of a multiplier 90 while the voltage V of Equation 10*a*, derived from the anode of the tube 69, is applied to its other input point. The product is added in an adder 91 to the output $a_i$ of the decoder 54. Hence, after these operations, the output of the adder 91 has the form $$a_i+(a_{i+1}-a_i)x$$

wherein, as before, $x$ is merely an abbreviation for the time, following the $i$th sample and preceding the $(i+1)$th sample, divided by the interval between these two samples. It may therefore be applied to a reproducer 93 without further processing. To exclude extraneous components due to switching transients and the like, it may be preferred to interpose a low-pass filter 94 of conventional construction and proportionment.

It has been proposed that portions of a vision signal characterized by a large amount of fluctuation, and hence representing portions of an image characterized by a high density of abrupt transitions, be quantized before transmission somewhat coarsely, while vision signal portions corresponding to parts of the image characterized by more gradual brightness changes are quantized for transmission much more finely. One such proposal is contained in an application of E. R. Kretzmer, Serial No. 573,022, filed March 21, 1956, now Patent No. 2,946,851, granted July 26, 1960. Any such proposal, while different in instrumentation and programming from the present one, inherently turns the same properties of the eye to account for the sake of the transmission economy afforded. Hence any such proposal may advantageously be combined with the present one with the result that reduction of the transmitted pulse rate results almost all of the time and under almost every picture condition. When the sample rate is momentarily high the number of pulses per sample is reduced by coarse quantization while, to the contrary, when the pulses per sample are large because of the need for fine quantization, the number of samples per second is reduced by the present proposal.

Still other modifications and extensions of the invention will suggest themselves to those skilled in the art. Thus, for example, the invention has been described in terms of the derivation of wave samples from successive portions of a vision signal corresponding to successive portions of a single scanning line in a conventional television camera tube. The principles of the invention are equally applicable to the derivation of samples of a much more extended vision wave derived from an entire scanning frame or sequence of frames. Generalization of the notion of transition sampling to outline sampling in two dimensions leads to modification of the apparatus described above by which the line transition sampling program may be so extended.

What is claimed is:

1. In combination with a source of a television wave characterized by portions of rapid, irregular fluctuation and by other portions of extended length throughout which fluctuation is substantially absent, said other portions being irregularly interspersed among said fluctuating portions, apparatus which comprises means for deriving a marking signal at each instant at which the slope of the wave changes in sign, at each instant at which it attains zero magnitude and at each instant at which it departs from zero magnitude, means for deriving a brief sample of the amplitude of said wave under control of each of said marking signals, whereby the sequence of said samples is characterized by the same irregularity as is the original wave, means for transmitting the amplitude and the instant of occurrence of each sample of said sequence to a receiver station, and, at said receiver station, means for reproducing said irregular sample sequence from said transmitted amplitudes and instants, and means for reconstituting said television wave from said reproduced sample sequence.

2. Apparatus as defined in claim 1, wherein said marking signal deriving means comprises a first differentiator, a quantizer and a second differentiator, connected together in tandem in the order named.

3. In combination with apparatus as defined in claim 2, means for applying said television wave to said first differentiator.

4. In combination with apparatus as defined in claim 2, a full wave rectifier connected to the output point of said second differentiator.

5. In combination with apparatus as defined in claim 4, a limiter connected to the output point of said rectifier, proportioned to reduce the magnitudes of all nonzero outputs of said rectifier to the smallest of said magnitudes.

6. In combination with apparatus as defined in claim 1, means at said receiver station for generating an interpolation wave that varies linearly in magnitude between each reproduced sample and the next, changing in slope abruptly at each sample, an image reproducer, and means for applying said interpolation wave to said reproducer.

7. In combination with a source of a television wave characterized by portions of rapid, irregular fluctuation and by other portions of extended length throughout which fluctuation is substantially absent, said other portions being irregularly interspersed among said fluctuating portions, apparatus which comprises means for continuously determining the slope of said wave, means for deriving a marking signal at each instant at which said slope changes by more than a first preassigned threshold $\epsilon_1$, means for deriving a second marking signal at each instant at which said slope changes by more than a second threshold $\epsilon_2$, means for combining said marking signals, means for deriving a brief sample of the amplitude of said wave under control of each of said combined marking signals, whereby the sequence of said samples is characterized by the same irregularity as is the original wave, means for transmitting the amplitude and instant of occurrence of each sample of said sequence to a receiver station, and, at said receiver station, means for reproducing said irregular sample sequence from said transmitted amplitudes and instants, and means for reconstituting said television wave from said reproduced sample sequence.

8. In a system for deriving from a television wave indicia of the instants at which the slope of said wave changes from any one of the conditions positive, zero or negative to any other of said conditions, a control signal path extending between an input terminal and an output terminal and comprising a first differentiator, a three-level quantizer, and a second differentiator, connected together in tandem in the order named, means for applying said television wave to said input terminal, and means for deriving a marking signal from said output terminal.

9. In combination with apparatus as defined in claim 8, a full wave rectifier connected to the output point of said second differentiator.

10. In combination with apparatus as defined in claim 9, a limiter connected to the output point of said rectifier, proportioned to reduce the magnitudes of all nonzero outputs of said rectifier to the smallest of said magnitudes.

11. Apparatus as defined in claim 8 wherein said three-level quantizer is a device having an input point and an output point and proportioned to deliver at its output point a signal having one or another of three and only three different discrete values accordingly as the wave slope signal output of the first differentiator applied to its input point lies above a positive preassigned threshold $\epsilon$, below a negative threshold $-\epsilon$ or between said two thresholds.

12. Apparatus as defined in claim 11 wherein said device is proportioned to deliver signals of values 1, −1, and 0 under said three respective input conditions.

13. In a system for deriving from a television wave indicia of the instants at which the slope of said wave changes from any one of the conditions positive, zero or negative to any other of said conditions, two control signal paths extending between an input terminal and an output terminal each comprising a first differentiator, a three-level quantizer, and a second differentiator, connected together in tandem in the order named, the quantization thresholds of said two quantizers being of substantially different magnitudes, means for applying said television wave to said input terminal and means for deriving a marking signal from said output terminal.

14. Apparatus as defined in claim 13 wherein each of said three-level quantizers is a device having an input point and an output point and proportioned to deliver at its output point a signal having one or another of three and only three different discrete values accordingly as the wave slope signal delivered by the first differentiator and applied to the input point of said device lies above the positive threshold of said device, below the negative threshold of said device, or between the two thresholds of said device.

15. Apparatus as defined in claim 14 wherein each of said devices is proportioned to deliver signals of values 1, −1, and 0 under said three respective input conditions.

16. In a system for deriving a sample of the amplitude of a television wave at each instant at which the slope of said wave undergoes an abrupt transition and for transmitting to a receiver station data defining the amplitude and instant of occurrence of each such sample, timing means comprising a source of pulses that recur at a high regular rate, a binary counter, means for clearing said counter at the inception of each intersample interval, means including said counter for counting the pulses of said source that occur between each clearing signal and the next clearing signal, means for also clearing said counter each time it has counted the pulses of said source up to the limit of its capacity, means for utilizing each such clearing signal to derive an amplitude sample of said wave, and means for coding and transmitting to said receiver station the pulse count registered in said counter immediately prior to each clearing signal.

References Cited in the file of this patent

UNITED STATES PATENTS

| | | |
|---|---|---|
| 2,589,767 | Bess | Mar. 18, 1952 |
| 2,676,202 | Filipowsky | Apr. 20, 1954 |
| 2,722,660 | Jones | Nov. 1, 1955 |
| 2,916,553 | Crowley | Dec. 8, 1959 |
| 2,924,711 | Kretzmer | Feb. 9, 1960 |